(12) United States Patent
Cysewski et al.

(10) Patent No.: US 11,242,877 B2
(45) Date of Patent: Feb. 8, 2022

(54) METHOD AND APPARATUS FOR JOINING COMPOSITE PANELS

(71) Applicant: The Boeing Company, Chicago, IL (US)

(72) Inventors: Sean Richard Cysewski, Snohomish, WA (US); Christopher Blaine Barney, Everett, WA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 16/240,736

(22) Filed: Jan. 5, 2019

(65) Prior Publication Data

US 2020/0217342 A1   Jul. 9, 2020

(51) Int. Cl.
*F16B 11/00*   (2006.01)
*F16B 21/04*   (2006.01)
*F16B 19/00*   (2006.01)

(52) U.S. Cl.
CPC ............ *F16B 11/006* (2013.01); *F16B 19/00* (2013.01); *F16B 21/04* (2013.01)

(58) Field of Classification Search
CPC ......... F16B 11/006; F16B 19/00; F16B 21/04
See application file for complete search history.

(56) References Cited

U.S. PATENT DOCUMENTS

2009/0142131 A1*  6/2009  Nugue ...................... E06B 3/02
                                                              403/300
2017/0204890 A1    7/2017  Lewis et al.

\* cited by examiner

*Primary Examiner* — Jeffry H Aftergut
*Assistant Examiner* — Jaeyun Lee
(74) *Attorney, Agent, or Firm* — Kolisch Hartwell, P.C.

(57) ABSTRACT

A method of joining panels is disclosed, including adhesively bonding a case in a slot of a first panel, the case having a channel on an inner side, and adhesively bonding a plate to a tab portion of a second panel, the plate having an external pin member. The method further includes inserting the tab portion of the second panel into the case in the slot of the first panel and sliding the external pin member of the plate along the channel on the inner side of the case, to a locking position.

20 Claims, 4 Drawing Sheets

METHOD AND APPARATUS FOR JOINING COMPOSITE PANELS

FIELD

This disclosure relates to systems and methods for joining panels. More specifically, the disclosed examples relate to mechanical connections between composite panels.

INTRODUCTION

Modern aircraft interiors are constructed largely from composite materials. Cabin floors, galley and lavatory walls, stow bins, and crew rests among others, are assembled from honeycomb composite panels. Each panel includes front and back skins sandwiching a porous core material. To assemble two panels, typically a tab formed on one panel is secured in a slot of the other panel with adhesives. However, at the panel edges the cell structure of the core material is exposed, complicating use of adhesives. Overfilling with adhesive to compensate for an unknown volume of void space requires removal of excess adhesive, which can be difficult or impossible in tight places or on decorative surfaces. Visual confirmation of sufficient adhesive application or correct positioning is limited, and bond strength relies on the strength of the core of the panel. Use of adhesives also prevents disassembly once panels have been assembled. An alternative to adhesive connection of panels is therefore desirable.

SUMMARY

The present disclosure provides systems, apparatuses, and methods relating to joining panels. In some examples, a method of joining panels may include adhesively bonding a case in a slot of a first panel, the case having a channel on an inner side. The method may further include adhesively bonding a plate to a tab portion of a second panel, the plate having an external pin member. The method may further include inserting the tab portion of the second panel into the case in the slot of the first panel and sliding the external pin member of the plate along the channel on the inner side of the case, to a locking position.

In some examples, a panel assembly may include a first panel and a second panel. The first panel may include a core sandwiched between a front skin and a back skin, a slot through the front skin, and a case nested in the slot. The case may have a first channel on an inner side. The second panel may include a tab member along an edge portion, configured for insertion into the case in the slot of the first panel. The tab member may have two opposing parallel side surfaces and at least one of the side surfaces may be bonded to a plate that has an external pin member configured for engaging the first channel of the case.

In some examples, a method of reversibly joining first and second panels may include bonding a plate to a tab portion on an edge of the first panel. The plate may have an internal pin member extending through a hole in the tab portion, and an external pin member. The method may further include inserting the tab portion of the first panel in a first direction into a case nested in a wall portion of the second panel, and engaging the external pin member of the plate with a channel on an inner side of the case. The wall portion may have a first skin, and the method may further include sliding the first panel relative to the second panel in a second direction parallel to the front skin, until the pin member reaches a locking end position of the channel.

Features, functions, and advantages may be achieved independently in various examples of the present disclosure, or may be combined in yet other examples, further details of which can be seen with reference to the following description and drawings.

DETAILED DESCRIPTION

Various aspects and examples of a method of joining panels, as well as related panel assemblies, are described below and illustrated in the associated drawings. Unless otherwise specified, a panel assembly in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, each of which is labeled accordingly.

Overview

In general, a panel assembly in accordance with the present teachings may include a first panel having a protrusion or tab and a second panel having a slot or recess. The tab may extend from an edge of the first panel, and the slot may be formed in a face of the second panel. A case or lining may be disposed in the slot of the second panel, and one or more interfacing structures may be disposed on the tab of the first panel. The case and interfacing structures may be fixed in place, for example by adhesive bonding. Inserting the tab into the slot may mechanically engage the interfacing structures with the case, to secure the first and second panels together.

Figure 1:
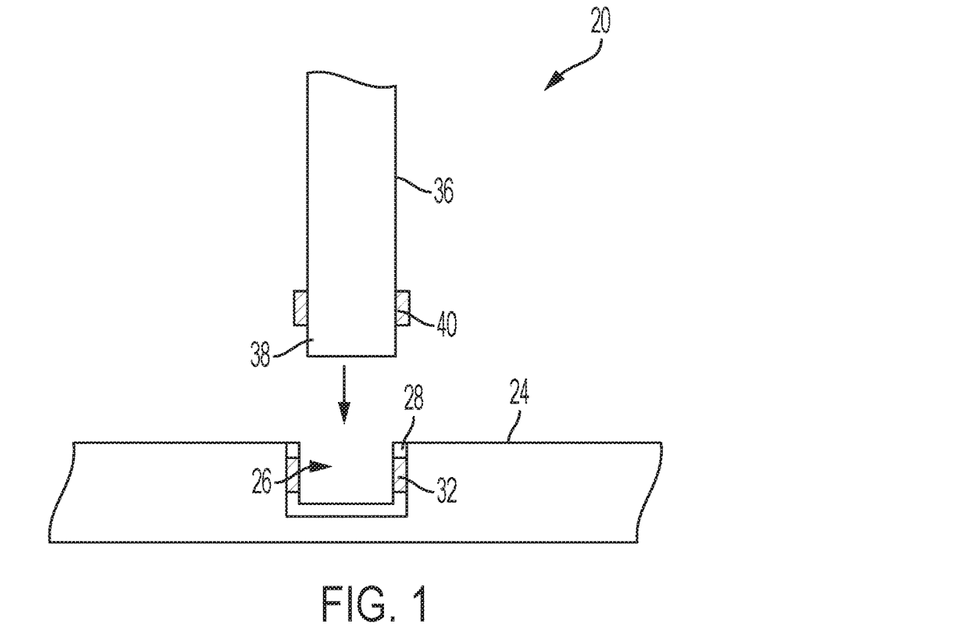
FIG. 1 is a schematic diagram of an illustrative panel assembly in accordance with aspects of the present disclosure.

FIG. 1 is a schematic diagram of a cross section of an illustrative panel assembly 20, including a first panel 24. The first panel includes a slot 26, in which is fixed a case 28. In the depicted example, case 28 is generally rectangular and includes an interfacing structure 32 on each of two opposing inner sides. Case 28 may have any effective shape, and may include one, three, or any number of interfacing structures 32 positioned anywhere on an interior of the case. The case may be adhesively bonded, fastened, or fixed in any effective manner to first panel 24.

Assembly 20 further includes a second panel 36 with a tab 38. Two interfacing structures 40 are disposed on opposing outer faces of the tab. In the depicted example, tab 38 is generally rectangular. Tab 38 may have any shape appropriate for receipt in case 28, and interfacing structures 40 may be positioned to correspond with interfacing structures 32 of the case.

Interfacing structures 32 of case 28 and interfacing structures 40 of tab 38 are configured to engage when the tab is inserted into the case. For example, interfacing structures 32 may include a channel or recess and interfacing structures 40 may include a pin or protrusion. For another example, interfacing structures 32 may include a pin or protrusion and interfacing structures 40 may include a channel or recess. Interfacing structures 32 may match or may be different structures. Similarly, interfacing structures 40 may match or may be different structures. Any mechanically engaging structure and/or combination of structures may be used.

A method of joining first panel 24 and second panel 36 may include adhesively bonding case 28 into slot 26, and adhesively bonding interfacing structures 40 to tab 38. The method may further include inserting tab 38 into case 28. To fully engage interfacing structures 32, 40, the method may include translating or sliding second panel 36 to move the interfacing structures to a locking position.

In some examples, the method may include disconnecting first panel 24 and second panel 36. Disconnection may be achieved by sliding second panel 36 in an opposite direction, to release interfacing structures from the locking position, and removing tab 38 from case 28. Panel assembly 20 may be configured for repeated connection and disconnection. Such disassembly may allow easy and time-efficient replacement of damaged panels, panel repair, and/or access to areas obscured by a panel.

First panel 24 and second panel 36 may be connected as described above, by engagement of a single tab 38 and slot 26. The first and second panels may also be connected by multiple such tab and slot connections. Tab and slot connections may be spaced along the panels according to a desired load tolerance. In some examples, additional and/or secondary connections may also be included.

Examples, Components, and Alternatives

The following sections describe selected aspects of exemplary panel assemblies and methods for joining panels, as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Panel Assembly

Figure 2:
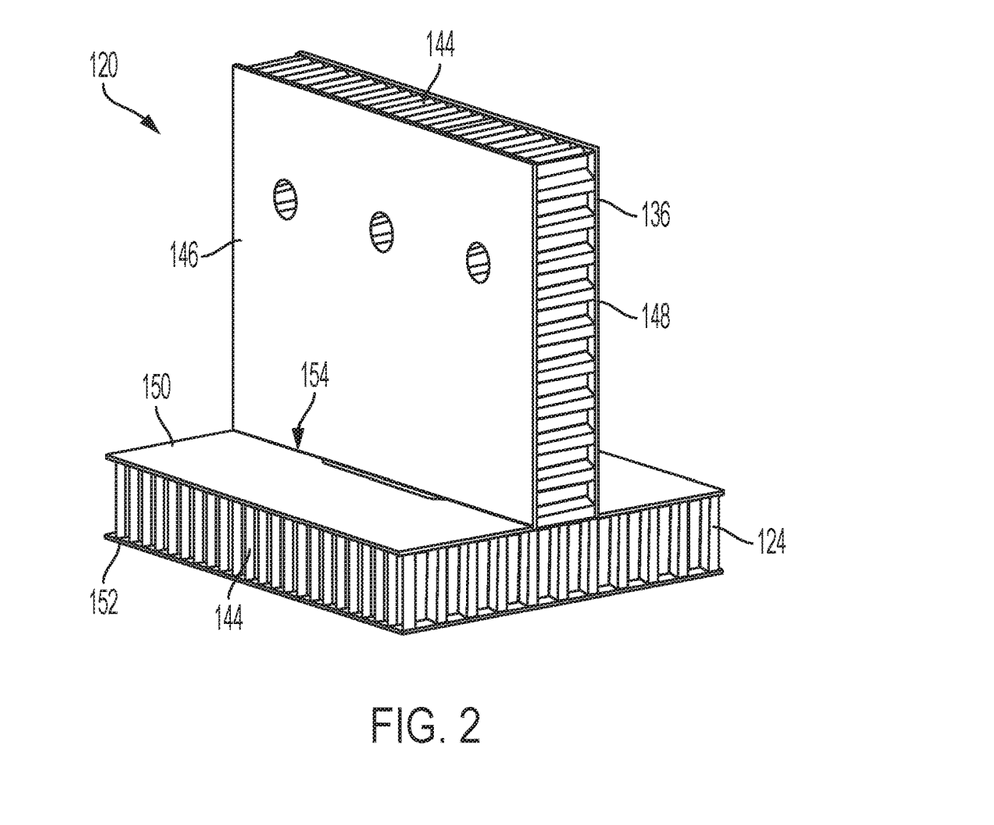
FIG. 2 is an isometric view of another illustrative panel assembly

As shown in FIGS. 2-6, this section describes an illustrative panel assembly 120. Panel assembly 120 is an example of panel assembly 20, described above. As shown in FIG. 2, panel assembly 120 includes a vertical panel 136 and a horizontal panel 124. The two panels may also be referred to as first and second panels and may be assembled and/or used in any desired orientation. References in the following description to top, bottom, left, right, vertical, and/or horizontal should be understood in relation to the depicted orientation of the panels, and not as absolute directions.

Each panel 124, 136 is a sandwich panel, and includes a core 144 between two planar, parallel skins. Vertical panel 136 includes a front skin 146 and a back skin 148. Horizontal panel 124 includes a top skin 150 and a bottom skin 152. Skins 146, 148, 150, 152 may include one or more composite materials, such as a fiber-reinforced thermoplastic. Core 144 may have a honeycomb structure, with columnar, hexagonal cells. In the present example, each panel has an overall thickness of approximately 1 inch.

In the present example, vertical panel 136 is joined perpendicularly to horizontal panel 124, with a bottom edge 154 of the vertical panel abutting top skin 150 of the horizontal panel. The two panels may be described as forming a right angle. The shape, spacing, and relative orientation of the two panels may be selected according to an intended use of panel assembly 120. In some examples, the panels may form an angle, such as 45 degrees, or any other angle. In some examples, vertical panel 136 may be recessed into horizontal panel 124, or a gap may be formed between bottom edge 154 of the vertical panel and top skin 150 of the horizontal panel. In some examples, one or both panels may be non-planar and may include curved and/or angled portions.

Figure 3A:
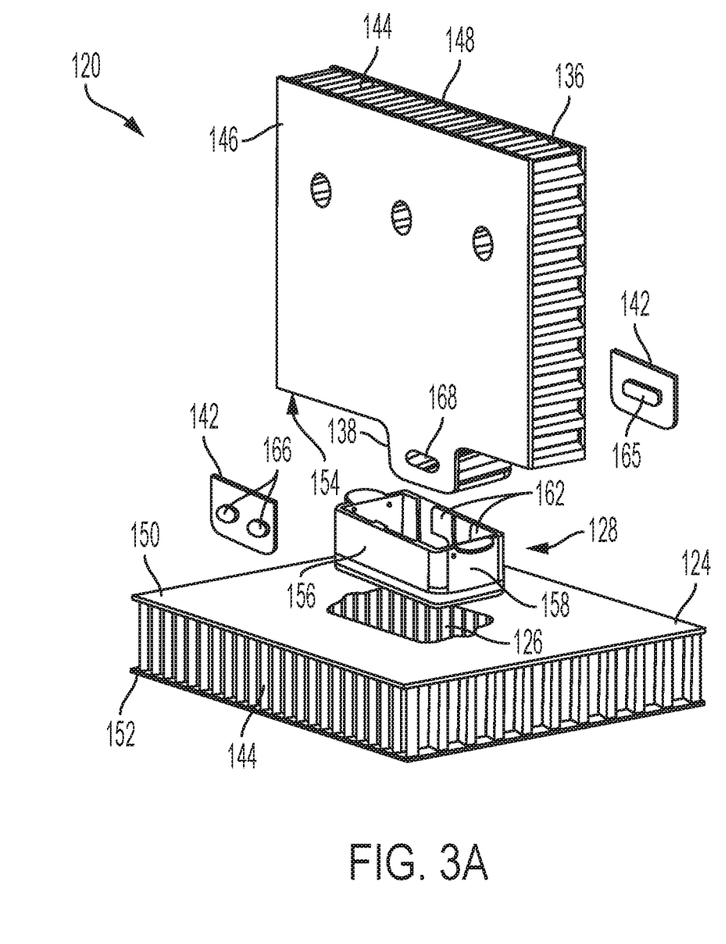
FIG. 3A is an exploded isometric view of the panel assembly of FIG. 2.

FIG. 3A is an exploded view of panel assembly 120, which shows a tab 138 of vertical panel 136 and a slot 126 in horizontal panel 124. Tab 138 extends down from bottom edge 154 of the vertical panel. The tab is formed of front skin 146, back skin 148, and core 144, extending parallel and coplanar with the rest of vertical panel 136. Tab 138 may be described as having two opposing parallel side surfaces. Slot 126 is recessed into horizontal panel 124, extending through top skin 150 and a majority of core 144. In the present example slot 126 extends perpendicular to horizontal panel 124. The slot may be oriented according to a desired relative orientation of vertical panel 136 and horizontal panel 124. In some examples the slot may be disposed in a wall portion of a panel.

Panel assembly 120 further includes a case 128 and two plates 142. The case and plates may include any material and/or materials having desirable cost, strength, weight, and temperature resistance. Examples include metals such as aluminum alloys, and plastics such as acetal, acrylic, nylon 6/6, polycarbonate (PC), polyurethane (PU), polyvinylchloride (PVC), polyvinylidene fluoride (PVDF), acrylonitrile butadiene styrene (ABS), polyetherimide (PEI), poly ether ketone (PEEK), polyphthalamide (PPA), and polyphenylene sulfide (PPS). Plastics may be fiber reinforced for additional strength.

Figure 3B:
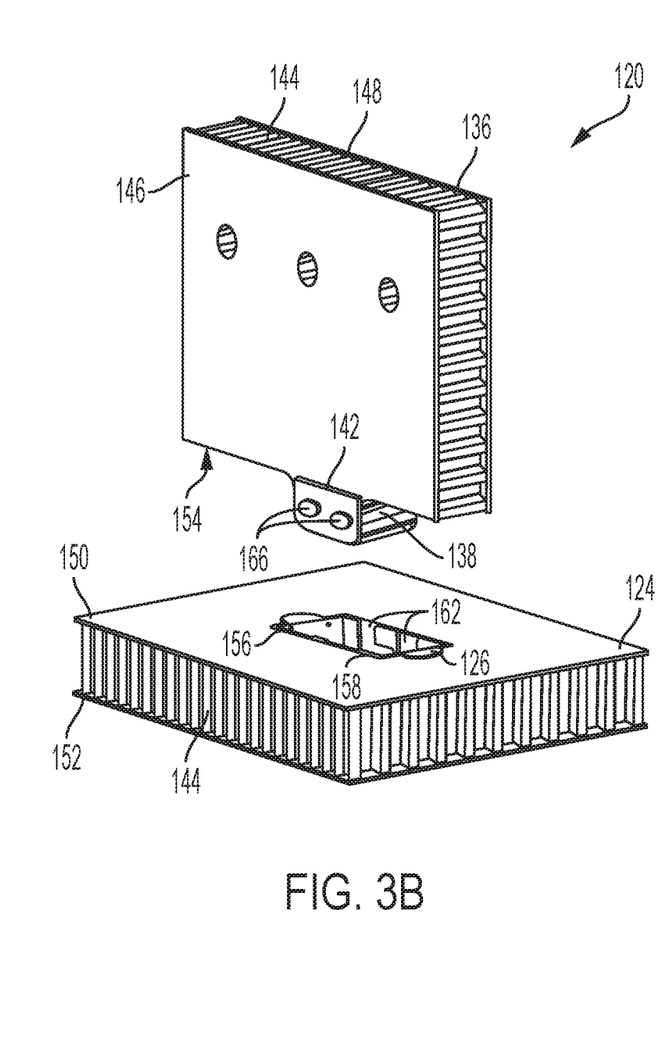
FIG. 3B is an isometric view of the panel assembly of FIG. 2, unjoined.

Case 128 is shaped to conform closely to slot 126. The case is open on top and generally rectangular, including two long side walls 156, two short side walls 158, and a bottom wall. In the present example, case 128 measures approximately 2.5 inches long, by 1.3 inches wide, by 0.875 inches tall. As shown in FIG. 3B, side walls 156, 158 of the case contact an inner edge of top skin 150. Case 128 may be shaped to leave no gap between the case and top skin 150 and to sit flush with the top skin. The exterior of the side and/or bottom walls of case 128 may include ridges, recesses, and/or any features appropriate for effective connection to horizontal panel 124. For example, some portion of the sides and bottom of case 128 may be spaced from core 144 when the case is received in slot 126, thereby facilitating flow of an adhesive around the case.

Case 128 has an interior volume, defined between side walls 156, 158 and the bottom wall. The interior volume is sized and shaped to slidably receive tab 138 of vertical panel 136 and plates 142. Tab 138 may be described as configured for insertion into case 128. When received in the case, tab 138 and plates 142 may contact and/or closely conform to long side walls 156 and may be spaced from at least one of short side walls 158. Opposing long side walls 156 include coplanar recessed channels 162, as described further in reference to FIGS. 4A-C, below.

Each plate 142 has an internal face, configured to contact front skin 146 or back skin 148, and an external face configured to engage case 128. In the present example, the internal face of each plate 142 includes one internal pin member 165, and the external face of each plate 142 includes two external pin members 166. Plates 142 may include any features and/or structures appropriate to facilitate connection with tab 138 and case 128. For example, one or both plates may include a snap-fit feature, apertures configured to receive a fastener, and/or any effective number of pins. In the present example, plates 142 are matching and shaped to conform to tab 138. Conforming to the shape of tab 138 may maximize surface area and provide good shear strength. However, plates 142 may have any effective shape.

Tab 138 includes a central aperture, recess, or hole 168. The hole is configured to receive internal pins 165 of plates 142. In the present example, hole 168 extends through front skin 146, core 144, and back skin 148. A single such hole, extending through the full extent of the tab may be straightforward to cut correctly and require a minimum of processing time. In some examples, tab 138 may include two opposing holes, each extending through one of front skin 146 or back skin 148 and only partway through core 144.

To connect plates 142 to tab 138, as shown in FIG. 3B, internal pins 165 of the plates may be inserted into opposite ends of hole 168. The plates may contact front skin 146 and back skin 148, respectively, which may also be described as first and second sides of tab 138. As shown in FIG. 3A, internal pins 165 and hole 168 have a matching rounded, elongate shape. Such an elongate shape may prevent rotation of plates 142 relative to tab 138, once internal pins 165 are received in hole 168. An elongate shape may also provide a flat, extended surface area of contact between internal pins 165 and skins 146, 148, for efficient load transfer.

Each internal pin 165 engages a respective one of skins 146, 148 to transfer applied loads. Skins 146, 148 may be rigid and provide better load transfer than core 144. Internal pins 165 may accordingly have a length at least matching the thickness of skins 146, 148 to maximize contact surface area. In the present example, skins 146, 148 measure approximately between 0.02 inches and 0.04 inches thick. Though each internal pin may have any effective length, additional length greater than the panel skin thickness may add weight without increasing contact surface area between the pin and the panel skin.

For some applications of panel assembly 120, engagement between internal pin 165 and hole 168 may provide sufficient strength. For high-load applications, additional strength may be provided by an adhesive. For example, a pressure sensitive peel-and-stick adhesive layer may be applied between tab 138 and plates 142. Examples of appropriate adhesives include solvent based adhesives, such as acrylic, styrene block copolymer, silicone and polyisobutylene, and water based adhesives, such as acrylic, vinyl acetate ethylene and certain elastomer types. A peel-and-stick adhesive may be preferable to a viscous adhesive liquid, being easy to apply without risk of over-application requiring removal of adhesive from adjoining surfaces.

Figure 4A:
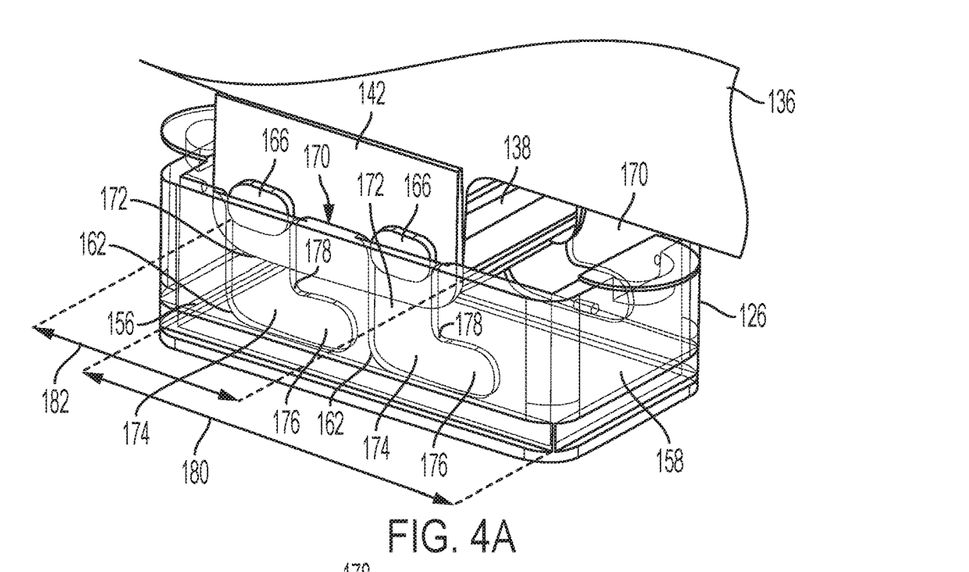
FIG. 4A is a partially transparent detail view of the panel assembly of FIG. 2, with the external pins of the plates engaging the first legs of the channels of the case.
Figure 4B:
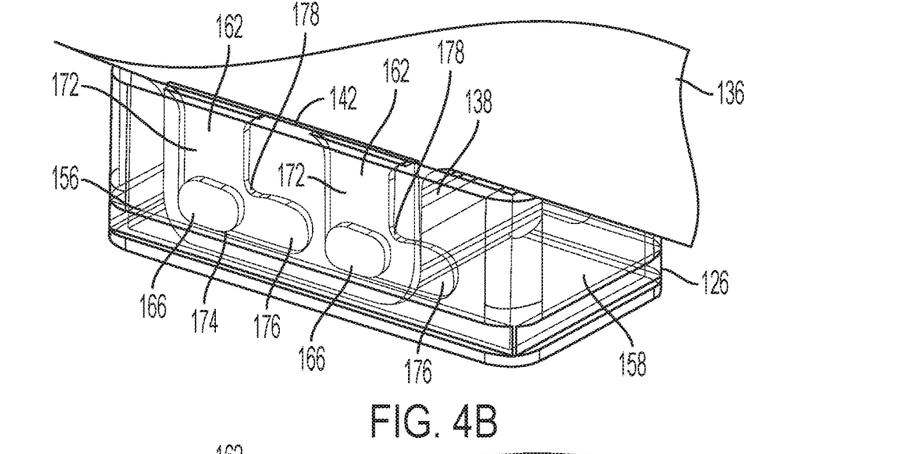
FIG. 4B is a partially transparent detail view of the panel assembly of FIG. 2, with the external pins of the plates engaging the second legs of the channels of the case.
Figure 4C:
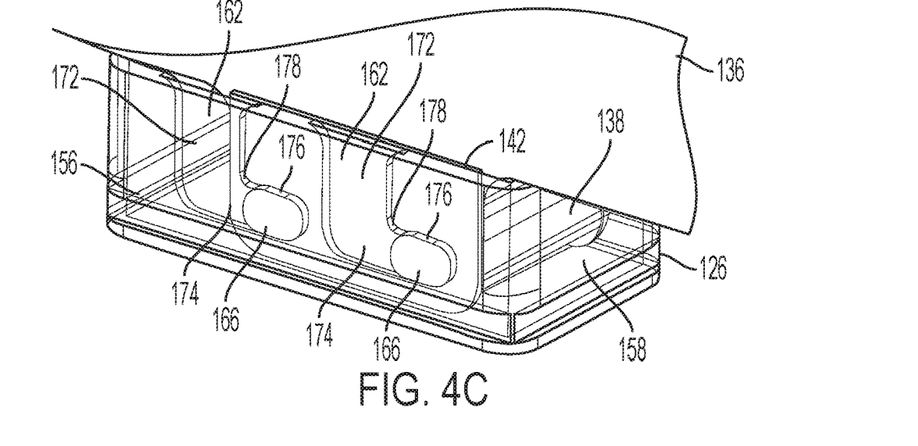
FIG. 4C is a partially transparent detail view of the panel assembly of FIG. 2, with the external pins of the plates engaging the locking positions of the channels of the case.

Once plates 142 are connected to tab 138 of vertical panel 136, and case 128 is nested in slot 126 of horizontal panel 124, as shown in FIG. 3B, tab 138 and plates 142 may be inserted into case 128. FIGS. 4A-4C are detail views of stages of this insertion, with horizontal panel 124 not shown and case 128 shown as transparent. As noted above, case 128 includes multiple coplanar channels 162.

Each channel 162 is formed on the inside of case 128, on an inner side 170 of a long side wall 156. The channel is recessed into the side wall, by approximately half of the side wall's thickness. In the present example, long side walls 156 measure approximately 0.1 inches thick and channels 162 are recessed approximately 0.04 inches deep. Each channel is configured to receive and engage an external pin 166. Case 128 and/or plates 142 may be sized such that the combination of tab 138 and plates 142 closely conform to case 128, thereby engaging external pins 166 with channels 162 as the tab is inserted. External pins 166 may have a length closely matching the depth of channels 162. In the present example, external pins 166 may have a length of approximately 0.04 inches. As tab 138 is inserted into case 128, each external pin may traverse the length of a channel.

In the present example, the case includes four channels 162. Two of the channels are formed on a first long side wall 156, and two of the channels are formed on a second long side wall. The two channels of each long side wall 156 are spaced to correspond to the two external pins 166 of one of plates 142. In the present example, plates 142 are matching, and external pins 166 of each plate are matching, therefore all four channels 162 are also matching. In some examples, one or more pairs of corresponding channels and external pins may have differing shapes. However, the channels may be constrained to a matching length, such that all external pins traverse the corresponding channels simultaneously as vertical panel 136 is moved.

Each channel 162 includes a vertical leg 172, and a horizontal leg 174. The legs may also be referred to as a first leg and a second leg. In the present example, vertical leg 172 and horizontal leg 174 are perpendicular. The legs may have any effective shape and orientation, as described further with reference to FIGS. 5A-C below. To traverse external pins 166 through channels 162, each pin may be slid down vertical leg 172 and along horizontal leg 174 to a lock position 176. Vertical panel 136 may be thereby connected to horizontal panel 124 by the engagement of external pins 166 with channels 162.

At a top end of vertical leg 172, each channel 162 flares outward. Together with the rounded shape of each external pin 166, the flared entrance to the channel may facilitate insertion of the pin into the channel by urging the pin toward the center of the channel. Pins 166 may be slid along vertical legs 172 by lowering vertical panel 136 toward horizontal panel 124. As shown in FIG. 4B, channels 162 may be sized such that each external pin 166 reaches the bottom of the corresponding channel when bottom edge 154 of vertical panel 136 contacts case 128. Such sizing may provide a flush connection between the vertical and horizontal panels.

To traverse external pins 166 along horizontal leg 174, vertical panel 136 may be slid in a direction parallel to the top skin of the horizontal panel. To allow tab 138 to slide in case 128, the tab may be shorter than the case. That is, case 128 includes a length 180 and tab 138 includes a length 182. Length 182 is less than length 180. In the depicted example, length 182 is sufficiently less length 180 that tab 138 does not contact either of short side walls 158. Spacing the tab from the short side walls may avoid frictional resistance and/or wear and may increase the tolerances in lengths 180 and 182. In some examples, tab 138 may contact a first short side wall as external pins 166 are slid down vertical leg 172 and may contact the second short side wall as the external pins reach lock position 176.

Horizontal leg 174 includes a narrowed region or restricted neck portion 178 proximate lock position 176. To slide an external pin past the restricted neck to lock position 176, as shown in FIG. 4C, application of a limited degree of force may be required. The restricted neck may thereby provide tactile feedback that the external pin has reached the lock position. The external pin may be described as configured to pop, snap, or click into the lock position.

The degree of force required to click each external pin 166 into lock position 176 may be selected to provide resistance to disconnection of vertical panel 136 from case 128. In lock position 176, external pins 166 may engage channels 162 to prevent vertical movement of vertical panel 136. Engagement of external pins 166 with restricted necks 178 may resist horizontal movement of vertical panel 136.

In lock position 176, engagement of external pins 166 with walls of channel 162 may resist vertical movement of vertical panel 136. In the present example, external pins 166 have an elongate shape. The pins are curved at opposing sides, with flat areas on top and bottom surfaces. The elongate shape may provide good contact surface area, for effective load distribution. External pins 166 are also have significantly greater height and width than length. Such a shape, which may be described as flattened, stubby, or plateau-like, may provide good resistance to shearing forces.

The length of external pins 166 and corresponding depth of channels 162 may be minimized while retaining desired load capacity. Minimizing these dimensions may result in a minimized appearance of the tab-slot connection. A portion of case 128 and plates 142 may be visible even when tab 138 is entirely received in the case. A fillet seal or other material may be used to cover the visible join. Plates 142 may also be sized to lie flush with case 128 when the tab 138 is received in case 128, to facilitate covering of the join.

Returning to FIGS. 4A-C, in the present example each plate 142 includes two external pins 166. In some examples, one or both plates may include a single external pin. For comparable contact surface area to achieve a desired load capacity, a single pin may be longer and therefore require a greater travel distance. That is, the horizontal leg of each channel may need to be extended. The vertical leg of each channel may also need to be widened. Such extension and widening may require corresponding increases in the difference between length 180 of case 128 and length 182 of tab 138. In some examples, one or both plates 142 may include three or more external pins. However, additional corresponding channels may require a corresponding increase in length 180 of case 128 or decreasing spacing between channels may result in diminished structural strength of the channels. Inclusion of two external pins 166 on plates 142 may be preferable to provide a maximum of strength in a minimum volume.

Figure 5A:
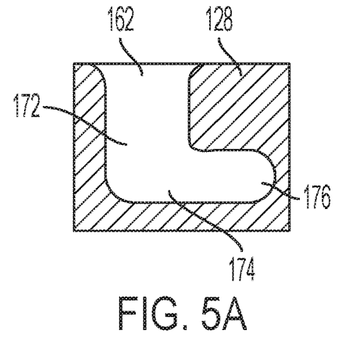
FIG. 5A is a side view of a channel of the case of the panel assembly of FIG. 2
Figure 5B:
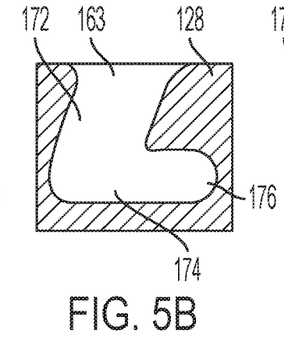
FIG. 5B is a side view of another illustrative channel.
Figure 5C:
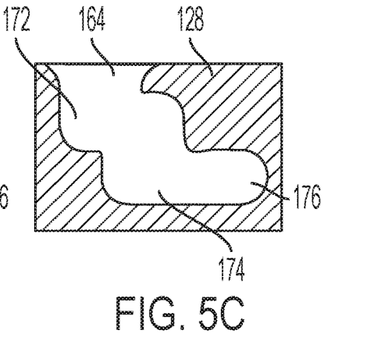
FIG. 5C is a side view of another illustrative channel.

FIG. 5A is a schematic diagram of a channel 162 of the present examples. FIGS. 5B-C are illustrative alternative examples of channels in accordance with the present disclosure. Channels 162, as shown in FIG. 5A, may be described as L-shaped and/or non-linear. The legs of the channel may be described as having longitudinal axes. When case 128 is installed in horizontal panel 124, the longitudinal axis of the vertical leg may be perpendicular to the top skin of the horizontal panel. The longitudinal axis of the horizontal leg may be parallel to the top skin of the horizontal panel.

FIG. 5B shows a channel 163 with a vertical leg 172 extending at an oblique angle from the top of case 128. The vertical leg forms an acute angle with a horizontal leg 174 of the channel. FIG. 5C shows a channel 164, including a stepped transition portion between a vertical leg 172 and a horizontal leg 174. In the depicted examples, each leg or step of the stepped portion of the channel is linear. In some examples, the vertical leg and/or a transition portion between the vertical and horizontal legs may be curved and/or include curved sections. The L-shape of channel 162 may provide a simple connection, which may be intuitive to use. Channels with additional complexity, such as channels 163 and 164, may provide improved resistance to disconnection.

The horizontal legs of channels 162, 163, and 164 are shaped to allow a flush joint between planar vertical and horizontal panels. The shape of the horizontal and/or second leg may be constrained by the motion achievable with the vertical panel. In some examples, such as connections for which the vertical panel is spaced from the horizontal panel, the horizontal leg may include curves and/or angles.

Figure 6:
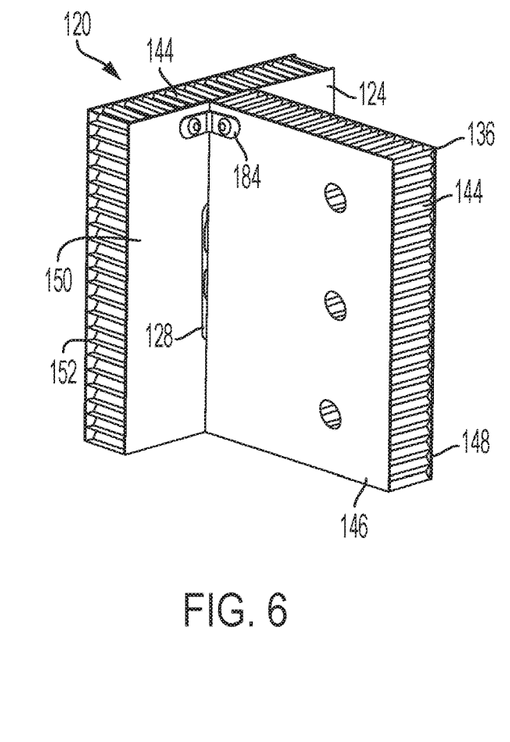
FIG. 6 is another isometric view of the illustrative panel assembly of FIG. 2, further including a bracket.

As shown in FIG. 6, panel assembly 120 further includes a secondary connection between vertical panel 136 and horizontal panel 124. In the present example, the secondary connection is a bracket 184. The bracket is positioned at one end of the join between the vertical and horizontal panels. Each end of the L-shaped bracket is secured to one of the two panels by a fastener.

Bracket 184 is configured to prevent sliding of vertical panel 136 parallel to top skin 150 of horizontal panel 124. Preventing such motion may in turn prevent disconnection of the panels, by retaining external pins 166 in lock positions 176 of channels 162, as shown in FIG. 4. A single bracket may be used for multiple tab and slot connections between the two panels.

Any effective secondary connection may be used to prevent disengagement of the tab and slot connection. A majority of connection strength between the panels may be provided by the tab and slot connection. Loads parallel to top skin 150 may be significantly less than loads perpendicular to the top skin. This may allow use of a single, light-weight secondary connection to resist in-plane loads.

B. Illustrative Method

Figure 7:
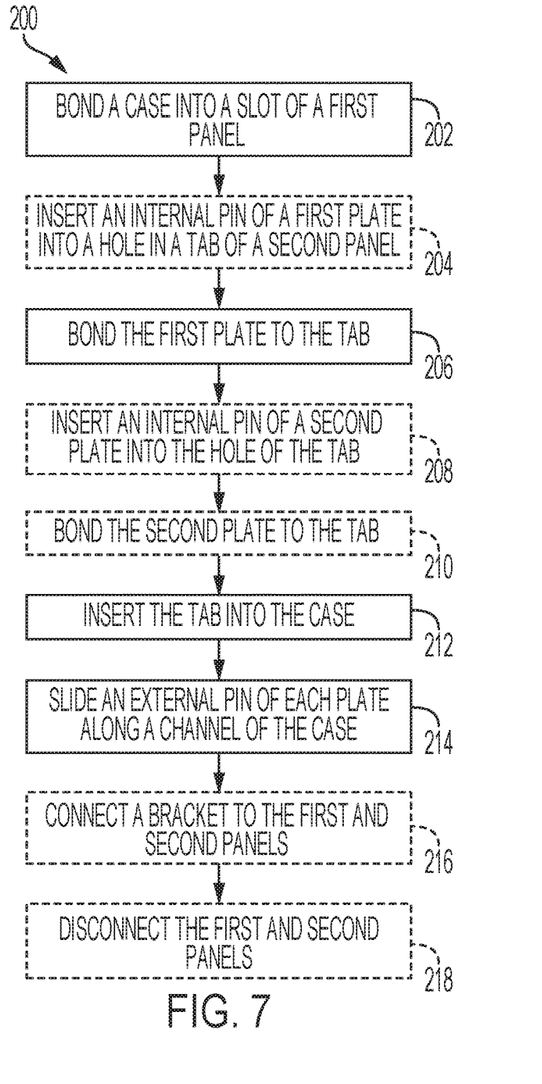
FIG. 7 is a flow chart depicting steps of an illustrative method for joining panels according to the present teachings.

This section describes steps of an illustrative method of joining panels; see FIG. 7. Aspects of panels and connections described above may be utilized in the method steps described below. Where appropriate, reference may be made to components and systems that may be used in carrying out each step. These references are for illustration and are not intended to limit the possible ways of carrying out any particular step of the method.

FIG. 7 is a flowchart illustrating steps performed in an illustrative method and may not recite the complete process or all steps of the method. Although various steps of method 200 are described below and depicted in FIG. 7, the steps need not necessarily all be performed, and in some cases may be performed simultaneously or in a different order than the order shown.

At step 202 the method includes bonding a case into a slot of a first panel. The first panel may include a skin and a core material, the slot being cut through the skin into the core material. The case may be shaped to conform to the slot, and may have a generally rectangular interior volume. Adhesive may be applied to the slot and/or the case prior to inserting the case into the slot. Alternatively or additionally, adhesive may be applied through one or more apertures in the case subsequent to insertion in the slot.

Step 202 may comprise part of a preparation of the first panel, and may be performed during manufacture and/or finishing of the first panel. In some examples, multiple cases may be bonded to multiple slots in the first panel. The case or cases may be bonded into the slot of the panel, and any adhesive curing completed, prior to delivery of the panel to a work site.

Optional step 204 of the method includes inserting an internal pin of a first plate into a hole in a tab of a second panel. The second panel may include a tab sized for receipt in the case of the first panel. The hole may be cut through a first skin, a core material, and a second skin of the second panel.

At step 206, the method includes bonding the first plate to the tab. The first plate may be bonded to a first side of the tab. Step 206 may be performed concurrently with optional step 204. For example, an adhesive may be applied to the first plate and/or the tab prior to inserting the internal pin of the first plate into the hole. The first plate may then contact the tab once the internal pin is received in the hole, and the adhesive may bond the first plate to the tab. In some examples, a peel-and-stick pressure sensitive adhesive layer may be applied between the first plate and the tab.

Optional steps 208 and 210 include inserting an internal pin of a second plate into the hole of the tab, and bonding the second plate to the tab. The second plate may be bonded to a second, opposing side of the tab. In some examples, the first plate may be bonded to a first skin of the tab and the second plate may be bonded to a second skin of the tab. The second plate may match the first plate.

Steps 204-210 may comprise part of a preparation of the second panel, and may be performed during manufacture and/or finishing of the second panel. In some examples, the steps may be performed for multiple tabs of the panel. The plate or plates may be bonded to the tab or tabs of the second panel, and any adhesive curing completed, prior to delivery of the panel to a work site.

At step 212, the method includes inserting the tab into the case. Step 212, and subsequent steps of the method may be performed at a work site and may constitute part of panel assembly and/or construction. For example, step 212 may be performed in a cabin of an aircraft under construction, where the first and second panels are used to form walls of a galley. For another example, step 212 may be performed during manufacture and/or installation of an overhead stowage bin.

Step 212 may be performed simultaneously for multiple tabs of the second panel and cases of the first panel. The second panel may be aligned with the first panel, and the second panel may be brought into contact with the second panel as the tabs are inserted. Each tab may be fully received into the interior volume of the corresponding case.

Step 214 of the method includes sliding an external pin of each plate along a channel of the case. The case of the first panel may include one or more channels recessed into the walls defining the interior volume of the case. Each channel may correspond to an external pin of a plate of the second panel. The channels may include at least a first leg and a second leg. Inserting the tab into the case may slide the external pins along the first leg of each corresponding channel.

To slide the external pins along the second leg of the channel, the second panel may be slid in a direction parallel to an adjacent surface of the first panel. The tab may be thereby translated within the case. In some examples, the external pins may be moved along additional legs and/or structures of the channel, such as a stepped transition between the first and second legs.

The external pin may be slid along the channel to a locking end position of the channel. In the locking end position, engagement between the external pin and the channel may resist movement of the second panel away from the first panel. Sliding the external pin into the locking end position may include applying force to the second panel to push the external pin past a narrowed or restricted portion of the channel.

Optional step 214 includes connecting a bracket to the first and second panels. The bracket may be connected to the panels in any effective manner. For example, fasteners may be inserted through apertures in the bracket to engage the first and second panels. The bracket may fix the second panel relative to the first panel, preventing further sliding of the panel in directions parallel to the adjacent surface of the first panel. The bracket may be configured to withstand only loads expected in such directions, and may not be configured to provide significant resistance to movement of the second panel away from the first panel.

Optional step 218 includes disconnecting the first and second panels. Disconnecting the panels may include reversing each of steps 216, 214, and 212 of the method. For example, disconnecting the panels may include removing a bracket connecting the first and second panels. Disconnecting the panels may further include sliding the second panel in an opposite direction, parallel to the adjacent surface of the first panel, such that the external pins are removed from the locking end position. Disconnecting the panels may finally include removing the tab from the case.

Subsequent to performing optional step 218, repairs, replacements, and/or maintenance may be performed on the first and/or second panels. Once such processes are complete, steps 212, 214, and 216 may be repeated to reconnect the first and second panels.

Illustrative Combinations and Additional Examples

This section describes additional aspects and features of panel assemblies and methods of joining panels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. A method of joining panels, comprising:
adhesively bonding a case in a slot of a first panel, the case having a channel on an inner side, adhesively bonding a plate to a tab portion of a second panel, the plate having an external pin member, and inserting the tab portion of the second panel into the case in the slot of the first panel, and sliding the external pin member of the plate along the channel on the inner side of the case to a locking position.

A1. The method of A, wherein the channel has a restricted neck portion configured to resist movement of the external pin member out of the locking position of the channel.

A2. The method of either A or A1, wherein the plate is bonded to the tab portion by a peel-and-stick pressure sensitive adhesive layer.

A3. The method of any of A-A2, wherein the tab portion has first and second sides, the plate being bonded to the first side of the tab portion, a second plate being bonded to the second side of the tab portion, the second plate having an external pin member, the case having a second channel, each of the external pin members being configured to engage one of the channels on the inside of the case.

A4. The method of any of A-A3, further comprising: connecting a bracket to the first and second panels, the bracket being configured to prevent sliding movement between the panels.

A5. The method of any of A-A4, wherein the channel is nonlinear.

A6. The method of any of A-A5, wherein the inserting step includes sliding the external pin member along a first leg of the channel substantially perpendicular to a front side of the first panel, and then sliding the external pin member along a second leg of the channel substantially parallel to the front side of the first panel.

A7. The method of any of A-A6, wherein the channel has a first leg and a second leg, each leg having a longitudinal axis, the longitudinal axis of the second leg being parallel to a front side of the first panel.

A8. The method of A7, wherein the longitudinal axis of the first leg forms a right angle with the longitudinal axis of the second leg.

A9. The method of either A7 or A8, wherein the longitudinal axis of the first leg forms an acute angle with the longitudinal axis of the second leg.

A10. The method of any of A7-A9, further comprising: sliding the external pin member through a stepped transition portion between the first and second legs of the channel.

A11. The method of any of A-A10, further comprising: inserting an internal pin member of the plate into a recess in the tab portion.

B. A panel assembly, comprising:
a first panel including a core sandwiched between a front skin and a back skin, a slot through the front skin, and a case nested in the slot, the case having a first channel on an inner side, and a second panel including a tab member along an edge portion configured for insertion into the case in the slot of the first panel, the tab member having two opposing parallel side surfaces, at least one of the side surfaces being bonded to a plate having an external pin member configured for engaging the first channel of the case.

B1. The panel assembly of B, wherein the case has a second channel, the first and second channels being on opposite sides of the tab portion, each of the side surfaces of the tab portion being bonded to a plate having an external pin member configured for engaging one of the first and second channels of the case.

B2. The panel assembly of either B or B1, wherein each plate has an internal pin member inserted through a hole in the adjoined side surface of the tab portion.

B3. The panel assembly of B2, wherein the internal pin member is elongate.

B4. The panel assembly of either B2 or B3, wherein each plate is bonded to the side surface by a peel-and-stick pressure sensitive adhesive layer.

B5. The panel assembly of any of B-B4, wherein the first channel on the inner side of the case is nonlinear.

B6. The panel assembly of B5, wherein the first channel has a first leg and a second leg, each of the first and second legs having a longitudinal axis, the longitudinal axis of the second leg being parallel to the front and back skins of the first panel.

B7. The panel assembly of B6, wherein the second leg of the first channel has a restricted neck portion configured to resist sliding of the external pin member out of a locking end position of the second leg.

B8. The panel assembly of either B6 or B7, wherein the longitudinal axis of the first leg is perpendicular to the longitudinal axis of the second leg.

B9. The panel assembly of any of B6-B8, wherein the longitudinal axis of the first leg forms an acute angle with the longitudinal axis of the second leg.

B10. The panel assembly of any of B6-B9, wherein the first channel has a stepped transition portion between the first and second legs of the first channel.

B11. The panel assembly of any of B-B10, further comprising: a bracket connected to the first and second panels configured to prevent sliding movement between the panels.

B12. The panel assembly of any of B-B11, wherein the case has a second channel inside the case opposite from the first channel.

B13. The panel assembly of any of B-B12, wherein the external pin member is elongate.

B14. The panel assembly of any of B-B13, wherein the plate has plural pin members, each pin member being configured to engage the first channel of the case.

B15. The panel assembly of any of B-B14, wherein the plate has plural pin members, and the case has plural coplanar channels on the inner side of the case, each pin member being configured to engage a different coplanar channel.

B16. The panel assembly of any of B-B15, wherein the first panel forms a right angle with the second panel.

B17. The panel assembly of any of B-B16, wherein the first panel forms an acute angle with the second panel.

C. A method of reversibly joining first and second panels, comprising:
bonding a plate to a tab portion on an edge of the first panel, the plate having an internal pin member extending through a hole in the tab portion, and having an external pin member, inserting the tab portion of the first panel in a first direction into a case nested in a wall portion of the second panel, engaging the external pin member of the plate with a channel on an inner side of the case, wherein the wall portion has a front skin, and sliding the first panel relative to the second panel in a second direction parallel to the front skin until the pin member reaches a locking end position of the channel.

C1. The method of C, wherein the first direction is perpendicular to the second direction.

C2. The method of either C or C1, wherein the first direction forms an acute angle with the second directions.

C3. The method of any of C-C2, further comprising:

moving the pin member through a stepped transition of the channel between the inserting and sliding steps.

C4. The method of any of C-C3, further comprising:
connecting a bracket to the first and second panels configured to prevent sliding movement between the panels.

C5. The method of any of C-C4, wherein the sliding step includes forcing the pin member past a restricted neck portion of the channel configured to resist sliding of the pin member out of the locking end position of the channel.

C6. The method of any of C-C5, further comprising:
sliding the pin member in a third direction opposite of the second direction, and in a fourth direction opposite of the first direction to disassemble the first panel from the second panel.

Advantages, Features, and Benefits

The different examples of the method of joining composite panels described herein provide several advantages over known solutions for joining composite panels. For example, illustrative examples described herein allow easy, non-destructive disassembly.

Additionally, and among other benefits, illustrative examples described herein allow connection of prepared panels without application of viscous adhesives.

Additionally, and among other benefits, illustrative examples described herein avoid removal of adhesive from panel surfaces, allowing application of decorative elements prior to connection.

Additionally, and among other benefits, illustrative examples described herein provide positive tactile feedback for correct connection.

No known system or device can perform these functions, particularly with high load tolerance and limited weight. Thus, the illustrative examples described herein are particularly useful for aircraft interior construction. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of joining panels, comprising:
adhesively bonding a case in a slot of a first panel, the case having a channel on an inner side,
adhesively bonding a plate to a tab portion of a second panel, the plate having an external pin member, and
inserting the tab portion of the second panel into the case in the slot of the first panel, and sliding the external pin member of the plate along the channel on the inner side of the case to a locking position.

2. The method of claim 1, wherein the channel has a restricted neck portion configured to resist movement of the external pin member out of the locking position of the channel.

3. The method of claim 1, wherein the plate is bonded to the tab portion by a peel-and-stick pressure sensitive adhesive layer.

4. The method of claim 1, wherein the tab portion has first and second sides, the plate being bonded to the first side of the tab portion, a second plate being bonded to the second side of the tab portion, the second plate having an external pin member, the case having a second channel, each of the external pin members being configured to engage one of the channels on the inside of the case.

5. The method of claim 1, further comprising:
connecting a bracket to the first and second panels, the bracket being configured to prevent sliding movement between the panels.

6. The method of claim 1, further comprising:
inserting an internal pin member of the plate into a hole in the tab portion.

7. A panel assembly, comprising:
a first panel including a core sandwiched between a front skin and a back skin, a slot through the front skin, and a case nested and adhesively bonded in the slot, the case having a first channel on an inner side, and
a second panel including a tab member along an edge portion configured for insertion into the case in the slot of the first panel, the tab member having two opposing parallel side surfaces, at least one of the side surfaces being adhesively bonded to a plate having an external pin member configured for engaging the first channel of the case.

8. The panel assembly of claim 7, wherein the case has a second channel, the first and second channels being on opposite sides of the case, each of the side surfaces of the tab member being bonded to a plate having an external pin member configured for engaging one of the first and second channels of the case.

9. The panel assembly of claim 7, wherein each plate has an internal pin member inserted into a hole in the adjoined side surface of the tab member.

10. The panel assembly of claim 9, wherein the internal pin member is elongate.

11. The panel assembly of claim 7, wherein the first channel has a first leg and a second leg, each of the first and second legs having a longitudinal axis, the longitudinal axis of the second leg being parallel to the front and back skins of the first panel.

12. The panel assembly of claim 11, wherein the second leg of the first channel has a restricted neck portion configured to resist sliding of the external pin member out of a locking end position of the second leg.

13. The panel assembly of claim 7, wherein the external pin member is elongate.

14. The panel assembly of claim 7, wherein the plate has plural pin members, and the case has plural coplanar channels on the inner side of the case, each pin member being configured to engage a different coplanar channel.

15. The panel assembly of claim 7, wherein the first panel forms a right angle with the second panel.

16. A method of reversibly joining first and second panels, comprising:

bonding a plate to a tab portion on an edge of the first panel, the plate having an internal pin member extending into a hole in the tab portion, and having an external pin member, inserting the tab portion of the first panel in a first direction into a case nested in a wall portion of the second panel, engaging the external pin member of the plate with a channel on an inner side of the case, wherein the wall portion has a front skin, and sliding the first panel relative to the second panel in a second direction parallel to the front skin until the pin member reaches a locking end position of the channel.

17. The method of claim 16, wherein the first direction is perpendicular to the second direction.

18. The method of claim 16, further comprising:
moving the pin member through a stepped transition of the channel between the inserting and sliding steps.

19. The method of claim 16, further comprising:
connecting a bracket to the first and second panels configured to prevent sliding movement between the panels.

20. The method of claim 16, further comprising:
sliding the pin member in a third direction opposite of the second direction, and in a fourth direction opposite of the first direction to disassemble the first panel from the second panel.

* * * * *